United States Patent
Waibel et al.

(10) Patent No.: US 10,168,601 B2
(45) Date of Patent: *Jan. 1, 2019

(54) FLYING CAMERA WITH STRING ASSEMBLY FOR LOCALIZATION AND INTERACTION

(71) Applicant: Perspective Robotics AG, Zurich (CH)

(72) Inventors: Markus Waibel, Zurich (CH); Sergei Lupashin, Zurich (CH); Markus Hehn, Zurich (CH); Raffaello D'Andrea, Wollerau (CH)

(73) Assignee: Perspective Robotics AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,295

(22) Filed: Sep. 5, 2017

(65) Prior Publication Data
US 2018/0149948 A1    May 31, 2018

Related U.S. Application Data

(63) Continuation of application No. 14/421,747, filed as application No. PCT/EP2013/067173 on Aug. 16, 2013, now Pat. No. 9,753,355.

(60) Provisional application No. 61/684,292, filed on Aug. 17, 2012.

(51) Int. Cl.
| | |
|---|---|
| *G03B 15/00* | (2006.01) |
| *G05D 1/08* | (2006.01) |
| *G05D 1/00* | (2006.01) |
| *G05D 1/10* | (2006.01) |
| *H04N 5/225* | (2006.01) |

(52) U.S. Cl.
CPC ............ *G03B 15/006* (2013.01); *G05D 1/005* (2013.01); *G05D 1/0011* (2013.01); *G05D 1/0094* (2013.01); *G05D 1/0866* (2013.01); *G05D 1/101* (2013.01); *H04N 5/2251* (2013.01); *H04N 5/2252* (2013.01); *H04N 5/2253* (2013.01); *H04N 2005/2255* (2013.01)

(58) Field of Classification Search
None
See application file for complete search history.

(56) References Cited

U.S. PATENT DOCUMENTS

| | | | | |
|---|---|---|---|---|
| 3,149,803 | A * | 9/1964 | Thracy | B64C 39/022 244/17.13 |
| 3,223,358 | A | 12/1965 | Quick | |
| 7,494,320 | B2 | 2/2009 | Muren | |
| 8,738,198 | B2 * | 5/2014 | Schempf | B25J 11/002 701/2 |

(Continued)

FOREIGN PATENT DOCUMENTS

| | | |
|---|---|---|
| FR | 2685283 A1 | 6/1993 |
| WO | 2010092253 A1 | 8/2010 |
| WO | 2012063220 | 5/2012 |

*Primary Examiner* — Navid Ziaeianmehdizadeh
(74) *Attorney, Agent, or Firm* — Sheppard Mullin Richter & Hampton LLP

(57) ABSTRACT

According to a first aspect of the present invention there is provided an arrangement comprising, a volitant body comprising at least one actuator; a control unit for controlling said actuator; and a mechanical arrangement for operationally connecting said volitant body to a reference point remote from said volitant body. There is further provided a corresponding method for operating such an arrangement.

20 Claims, 6 Drawing Sheets

(56) References Cited

U.S. PATENT DOCUMENTS

| | | | |
|---|---|---|---|
| 8,922,041 B1* | 12/2014 | North | F03D 7/00 244/153 R |
| 8,948,928 B2* | 2/2015 | Alber | B64C 39/022 244/17.11 |
| 9,187,173 B2* | 11/2015 | Morris | B64C 27/02 |
| 9,329,096 B1* | 5/2016 | Jensen | G01L 5/16 |
| 2007/0012818 A1 | 1/2007 | Miyazawa | |
| 2010/0108807 A1* | 5/2010 | Barrett | B64C 27/20 244/1 N |
| 2010/0295303 A1* | 11/2010 | Lind | B64C 39/022 290/44 |
| 2010/0295320 A1* | 11/2010 | Bevirt | B64C 39/022 290/55 |
| 2011/0024559 A1* | 2/2011 | McGeer | B64C 25/68 244/110 F |
| 2011/0266809 A1* | 11/2011 | Calverley | F03D 5/00 290/55 |
| 2011/0315810 A1* | 12/2011 | Petrov | B64C 39/022 244/17.23 |
| 2012/0091258 A1* | 4/2012 | Keidar | B64C 39/022 244/17.11 |
| 2012/0104763 A1* | 5/2012 | Lind | B64C 31/06 290/55 |
| 2013/0233964 A1* | 9/2013 | Woodworth | B64C 37/02 244/2 |
| 2014/0259549 A1* | 9/2014 | Freeman | A63H 30/02 24/298 |
| 2014/0263852 A1* | 9/2014 | Walker | B64C 39/022 244/53 R |
| 2014/0326831 A1* | 11/2014 | Vander Lind | B64C 31/06 244/155 A |
| 2014/0353421 A1* | 12/2014 | Zhang | B64C 39/022 244/17.17 |
| 2015/0041598 A1* | 2/2015 | Nugent | H02J 17/00 244/53 R |
| 2015/0191259 A1* | 7/2015 | Giovannini | B64F 3/02 701/3 |
| 2015/0251755 A1* | 9/2015 | Schaefer | B64C 39/022 290/55 |
| 2015/0331420 A1* | 11/2015 | Chubb | B64C 39/022 701/7 |
| 2016/0083115 A1* | 3/2016 | Hess | B64F 3/02 701/3 |
| 2016/0318607 A1* | 11/2016 | Desai | B64D 1/16 |

* cited by examiner

FLYING CAMERA WITH STRING ASSEMBLY FOR LOCALIZATION AND INTERACTION

FIELD OF THE INVENTION

The present invention relates to aerial imaging, particularly to a flying camera, equipped with rotary wings and a string assembly, and to its localization, stabilization, and interaction therewith.

BACKGROUND

Today the operation of most digital cameras remains restricted to viewpoints that are within an arm length's reach from the operator.

A variety of solutions, both flying and non-flying, have been proposed to solve this problem. However, current flying solutions are typically difficult to control, requiring pilot training and experience to successfully obtain an image from a desired view point. They are also highly susceptible to wind and prone to loss and collisions with high objects such as trees, power lines, or houses. Existing non-flying solutions, such as extendable poles, rely on ad hoc support elements like poles, masts, or base stations that lead to complicated, expensive, unwieldy, or otherwise impractical solutions. They are typically inexpensive and easy to use, but are cumbersome to transport and severely restrict the possible viewpoints.

BRIEF SUMMARY

In accordance with the present invention, limitations of previous methods for aerial imaging have been substantially reduced or eliminated. In particular, the present invention aims to provide improved systems and methods for position and attitude stabilization for volitant bodies including flying cameras using a string assembly. In addition, the present invention aims to provide an improved user interaction for volitant bodies including flying cameras.

In the context of the present invention, such user interaction typically enables the translation of user intention to perform an action with, or change the operation of, a volitant body. This is typically achieved through specific physical actions by the user (e.g., pulling a string) and through specific physical actions by the volitant body (e.g., pulling back on the same string). User interaction in the context of the present invention includes, but is not limited to a force applied by a user, or by the volitant body or by both, the activation of switches or buttons by the user, visual or audible signals from the user or from the volitant body, or pre-coded sequences and patterns of the above.

According to a first aspect of the present invention there is provided an arrangement comprising, a volitant body comprising at least one actuator; a control unit for controlling said actuator; and a mechanical arrangement for operationally connecting said volitant body to a reference point remote from said volitant body.

The volitant body preferably comprises a means for flying.

Preferably at least one actuator is configured to actuate said means for flying.

Preferably, the volitant body further comprises a camera.

The operational connection may be of mechanical nature.

Preferably, the mechanical arrangement mechanically connects the volitant body to the reference point.

The mechanical arrangement may be operationally connected to said control unit.

The arrangement may comprise an evaluation unit which is operable to provide data representative of at least one of (a) an attitude; or (b) a position of said volitant body relative to said reference point, to said control unit, and wherein said control unit is configured to control said at least one actuator based on said data.

In the present application, attitude means the full definition of the rotation of a rigid body relative to an inertial frame, i.e. the body's orientation in all three dimensions. An example inertial frame is the commonly used local gravity-ground referenced East-North-Up frame.

Preferably the evaluation unit is comprised in the mechanical arrangement and is preferably located on the volitant body. Said data provided by the evaluation unit is preferably based on mechanical forces applied to said mechanical arrangement.

Preferably the evaluation unit is located on the volitant body.

The arrangement may further comprise a sensing unit operable to provide data representative of mechanical forces applied to said mechanical arrangement to said evaluation unit. Preferably the mechanical arrangement comprises the sensing unit.

Preferably the sensing unit is located on the volitant body.

The sensing unit may be mechanically connected to said volitant body.

The arrangement may comprise a force sensor, for determining said mechanical forces, operationally connected to the sensing unit. Preferably the mechanical arrangement comprises the force sensor.

Preferably the force sensor is located on the volitant body

The arrangement may comprise a sensor for providing data representative of at least one of an acceleration, attitude, or rotational rate of the volitant body, which is operationally connected to the sensing unit. The arrangement may comprise a sensor, for providing data representative of said position of said volitant body relative to said reference point, which is operationally connected to the sensing unit.

The arrangement may comprise a memory unit operationally connected to said evaluation unit, in which is stored first data related to properties of said mechanical arrangement and second data related to properties of said volitant body, wherein said evaluation unit is configured for carrying out an evaluation using at least one of said first or second data, to provide said data representative of at least one of (a) an attitude or (b) a position of said volitant body relative to said reference point.

The arrangement may further comprise an active safety means, and/or passive safety means.

The arrangement may further comprise an active means, and/or passive means of user interaction.

Preferably the mechanical arrangement defines a means of user interaction.

According to a further aspect of the present invention there is provided, the use of any of the above-mentioned mechanical arrangements as a communication channel based on mechanical forces applied to the mechanical arrangement.

According to a further aspect of the present invention there is provided, the use of any of the above-mentioned mechanical arrangements for aerial imaging.

According to a further aspect of the present invention there is provided, a method for operating any of the above-mentioned mechanical arrangements, said method comprising a step of, controlling said at least one actuator to make said volitant body fly remote from said reference point.

Preferably the step of controlling said at least one actuator is done, using the mechanical arrangement.

The method may comprise the additional steps of,
using an evaluation unit to provide data representative of at least one of (a) an attitude; or (b) a position of said volitant body relative to said reference point; and
providing said data to the control unit, and wherein said control unit performs controlling of said at least one actuator based on said results of said data evaluation.

The method may comprise the steps of,
sensing mechanical forces applied to said mechanical arrangement; providing the evaluation unit with data which is representative of mechanical forces applied to said mechanical arrangement, and wherein the evaluation unit performs the step of using said data which is representative of mechanical forces applied to said mechanical arrangement to provide data representative of at least one of (a) an attitude; or (b) a position of said volitant body relative to said reference point.

The method may further comprise the steps of,
memorizing first data related to properties of said mechanical arrangement, and
memorizing second data related to properties of said volitant body, and performing an evaluation at the evaluation unit, using at least one of said first or second data, to provide said data representative of at least one of (a) an attitude; or (b) a position of said volitant body relative to said reference point.

The method may further comprise the steps of,
sensing mechanical forces applied to said mechanical arrangement; and
evaluating the sensed mechanical forces to provide evaluation results;
providing the control unit with the evaluation results, and wherein said step of controlling said at least one actuator is carried out based on said evaluation results.

Preferably the mechanical forces are applied to the mechanical arrangement at the reference point.

Preferably, the evaluation results may comprise data representative of at least one of: magnitude of force, a change in force magnitude, direction of force, and/or a force sequence.

At least one of the steps of evaluating or controlling may comprise the step of a user interacting with the mechanical arrangement.

Preferably, the step of a user interacting with the mechanical arrangement comprises the user applying one or more forces to the mechanical arrangement or the user reducing the force which is applied to the mechanical arrangement.

The step of sensing mechanical forces may comprise, sensing at least one of, direction, magnitude, or time sequence of mechanical forces.

The method may comprise the step of,
communicating with said reference point by applying one or more forces to said mechanical arrangement, wherein the said at least one actuator is controlled by the control unit so that the volitant body applies said one or more forces to the mechanical arrangement.

The step of controlling said at least one actuator may include at least one of executing emergent maneuvers, executing active maneuvers, detecting continuous user input, or detecting parallel user input.

According to a further aspect of the present invention there is provided a method of calculating at least one of attitude or relative position of a volitant body with respect to a reference point, implemented in an evaluation unit. The method may comprise a first step of, receiving first data from an inertial sensor mounted on said volitant body. Optionally the method may comprise a second step, of retrieving second data from the memory unit comprising prior data or calculations. The method may comprise the step of using the said first and/or second data to (a) predict the instantaneous motion of the vehicle, and (b) to calculate an approximate position of the volitant body relative to a reference point and/or the attitude of the volitant body. Optionally, this prediction and calculation can be improved using prior knowledge about the dynamics of the arrangement. Additional sensors, such as string length sensors, pressure sensors, range sensors or other sensors, may be used to further enhance the measurement, in a computationally rigorous manner. The method may comprise the step of mathematically combining the instantaneous motion prediction and approximate measurements to produce at least one of a volitant body attitude and/or volitant body position estimate with respect to a reference point.

The above evaluation unit provides technical advantages for certain embodiments of the present invention, including allowing for eliminating dependence on any outside infrastructure such as the visible or radio-magnetic beacons or GPS systems. Furthermore, said evaluation unit in combination with said mechanical arrangement enables further performance-enhancing features such as continuous calibration of actuator or flight parameters or estimation of external forces such as wind.

According to a further aspect of the present invention there is provided a method for the stabilization or controlled flight of a volitant body, wherein said volitant body comprises a control unit operationally connected to said volitant body and at least one actuator configured to actuate the means of flying. The method may comprise, receiving at a control unit data from said evaluation unit wherein the data specifies at least one of the attitude of the volitant body, the instantaneous motion of the volitant body, or the position of the volitant body with respect to a reference point. The method may comprise operating said control unit to access a memory unit to retrieve stored information. Preferably the retrieved information may include actuator calibration, flight parameters, predefined control behaviors or trajectories. The method may comprise the step of operating said control unit to calculate appropriate commands for at least one actuator and dispatching commands to said actuator(s). In addition, said control unit may return said actuator commands back to the said evaluation unit.

Preferably, the volitant body is the volitant body of the arrangement according to any one of the above-mentioned arrangements.

The step of combining the method implemented in said control unit with the methods implemented by said evaluation, sensing and/or memory units, and with the constraints imposed by said mechanical arrangement provides technical advantages. These advantages include favorable system stability qualities, better robustness against effects such as wind gusts, or better robustness against rapid movements of the reference point. Said combination allows the volitant body to maintain controlled flight even under challenging conditions such as when attached to a rapidly moving reference point such as a skier, a boat, or a car.

According to another aspect of the present invention there is provided a method for interacting with a volitant body, wherein said volitant body comprises,
a control unit operationally connected to said volitant body;

and a mechanical arrangement for operationally connecting said volitant body to a reference point remote from said volitant body, said method comprising the step of, receiving, at the control unit, data relating to at least one of direction, magnitude, or time sequence of forces applied to said mechanical arrangement, wherein the control unit performs the step of controlling the volitant body so that volitant body performs a predefined maneuver, wherein the predefined maneuver is associated with the data it receives. Preferably, the volitant body is the volitant body of the arrangement according to any one of the above-mentioned arrangements.

According to yet another aspect of the present invention there is provided a method for interacting with a volitant body, wherein said volitant body comprises, a control unit operationally connected to said volitant body;

an evaluation unit operationally connected to said volitant body; and a mechanical arrangement for operationally connecting said volitant body to a reference point remote from said volitant body, said method comprising the step of, receiving, at the evaluation unit, data relating to at least one of direction, of magnitude, or of forces applied to said mechanical arrangement, wherein the evaluation unit evaluates said data, in combination with data from said memory unit, to computationally detect specific sequences or patterns of at least one of direction, of magnitude, or of forces.

The evaluation unit may simultaneously command the control unit to alter its operation to, for example, provide haptic feedback to the user during user interaction. The result of the evaluation by the evaluation unit may be sent to the control unit to optionally perform at least one of a change of internal states, the execution of specific actions, or an alteration the current operating mode of the volitant body. Preferably, the volitant body is the volitant body of the arrangement according to any one of the above-mentioned arrangements.

The step of combining said evaluation unit, control unit, and mechanical arrangement therefore allows for controlled, user-interactive flight of a volitant body without the need for radio communication or complex configuration and programming. The volitant body may be launched and operated intuitively, with simple tasks such as aerial photography implemented through natural user hand gestures applied to the string. In addition, the said combination enables a novel channel of communication for the volitant body to communicate information back to the user, such as for example by effecting a specific pattern or sequence of forces on the string given a certain condition, such as a certain battery level or completion of a given task such as a panoramic photographic survey.

Technical advantages of certain embodiments of the present invention may allow even inexperienced users of all ages to safely capture imagery from a wide range of viewpoints without the need for ad-hoc support elements. For example, the present invention may allow minimizing or eliminating risks inherent in current aerial imaging arising from collisions, mechanical or electrical failures, electronic malfunctions, operator errors, or adverse environmental conditions, such as wind or turbulence.

Other technical advantages of certain embodiments of the present invention may allow easier operation in a wide variety of operating conditions and environments. This may allow even novice users, young users, or automated/semi-automated/user-controlled base stations to perform tasks currently performed by experienced human pilots with both manned and unmanned flying vehicles. The need for human pilots severely limits the cost-effectiveness, possible operating conditions, and flight endurance of flying vehicles in many applications. For example, even experienced human pilots cannot guarantee safe and efficient control in many real-world operating conditions including wind and turbulence.

Yet other technical advantages of certain embodiments of the present invention may allow it to be tailored to the specific needs of a variety of applications in a variety of contexts. Example applications include hobbyist platforms for communities such as DIY Drones; research platforms for groups actively researching flying platforms or using them as part of their curriculum; military use with requirements such as survivability, power autonomy, detectability, or operation in extreme conditions (weather, lighting conditions, contamination); toys such as small flying vehicles; stage performances including choreographies set to music and light or theater performances which require interaction with theater actors; recreational use similar to that of kites; industrial or public service applications (e.g., surveillance and monitoring of industrial sites, photogrammetry, surveying); professional aerial photography or cinematography; or inspection and monitoring of civil infrastructure, which may require dangerous or repetitive tasks. In particular, certain technical advantages allow the present invention to be equipped with a wide range of sensors. For example, infrared sensors allow embodiments for detection of patches of dry ground in orchards or for crop monitoring.

Other technical advantages of the present invention will be readily apparent to one skilled in the art from those following figures, descriptions, and claims. Moreover, while specific advantages have been enumerated above, various embodiments may include all, some, or none of the enumerated advantages.

BRIEF DESCRIPTION OF THE FIGURES

The present invention is described, by way of example only, with reference to the following figures, which illustrate exemplary embodiments of the invention.

DETAILED DESCRIPTION OF FIGURES

To facilitate an understanding of the present invention, it is described hereinafter with particular reference to a series of specific exemplary embodiments. It will be appreciated, however, that the principles which underlie the invention are not limited to these particular embodiments. Rather, these principles can be combined with many systems to localize, stabilize, interact with, and control volitant bodies using a mechanical arrangement.

In addition, various features of the invention are occasionally described in the context of their implementation for flying cameras and for the sample application of aerial imaging. These features are equally applicable to other types of volitant bodies, other sensors, and other applications. Consequently, specific aspects of the implementation that are described hereinafter should not be viewed as any limitation on the applicability of the invention to these volitant bodies, these sensors, or to any specific application.

Overview and Typical Mode of Use

Figure 1:
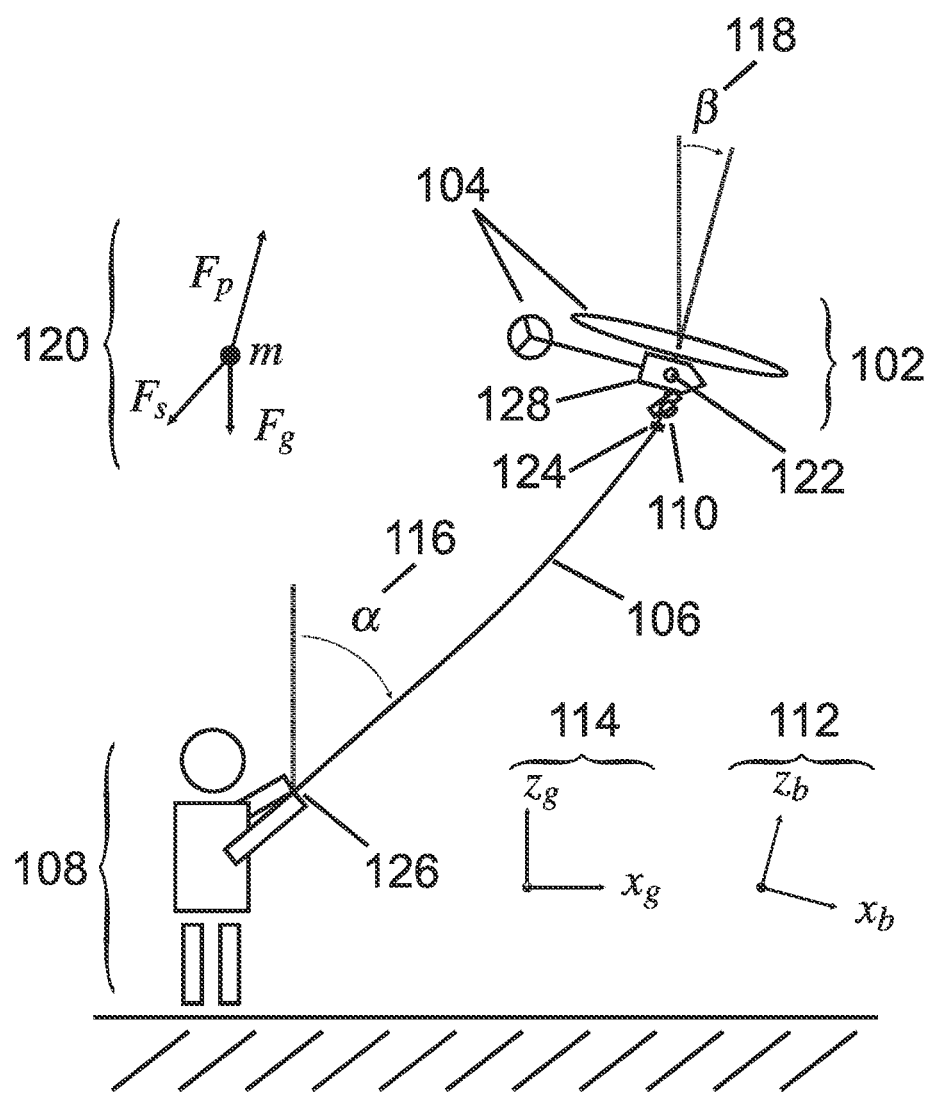
FIG. 1 shows a user controlling a first embodiment of a flying camera using a string.

FIG. 1 shows an example of a typical use scenario for the inventions described herein. A user 108 holds the user end of a mechanical arrangement (here a simple string assembly consisting of a single string 106). The string 106 is connected to a volitant body (here a flying camera 102) that lifts and stabilizes itself using a typical helicopter configuration: a propulsion/stabilization system 104 comprising a main, swash plate-equipped rotary wing for lift and lateral stabilization, and a small auxiliary tail propeller for yaw stabilization.

The string 106 enables the flying camera 102 to perform precise localization and stabilization relative to a reference point 126 (here near the user 108). In addition, the string 106 enables the user 108 to communicate with the flying camera 102 (and vice versa). Such user interaction may, for example, comprise pulling the string into a desired direction. This interaction can be achieved by, for example, using a directional force sensor 124 mounted on the flying camera 102 and attached to the string 106, and the flight module 128 (comprising, e.g., sensing units, evaluation units, memory units, or control units) which are attached to the body of the flying camera 102.

To facilitate explanation of the modes of interaction with the flying camera 102, the application in FIG. 1 is taken as aerial imaging: that is, the user is attempting to accomplish the end goal of collecting imagery from a desired viewpoint, typically from an elevated position, as enabled by the flying camera 102 equipped with a camera 110.

Localization and Stabilization

The present invention substantially reduces or eliminates the problems of recovering the attitude and the position of the flying camera 102, relative to the global coordinate system 114 and to the reference point 126, respectively. For clarity, the following explanation discusses the two dimensional (2D) case. However, the invention generalizes to, and is useful in, three spatial dimensions (3D).

The principal forces 120 acting on the center of mass 122 of the flying camera 102 are the force of gravity $F_g$, the force of propulsion $F_p$ generated by the rotary wings, and the force of the string $F_s$ pulled by the user 108. Angle α 116 denotes the angle between the user 108 and the flying camera 102. Angle β 118 denotes the angle of the direction of the force of gravity $F_g$ and the "up" direction $z_b$ of the flying camera 102.

On a typical volitant body, such as a flying vehicle, not attached to the ground, inertial sensors can not, to first order, provide absolute measurements of the angles α 116 and β 118. Second-order effects such as aerodynamic drag may enable such measurements in some conditions but do not provide angle information for hover flight. The present invention allows to overcome this limitation.

This may be achieved as follows. The flying camera 102 is equipped with sensors providing data representative of at least one of an acceleration, attitude, or rotational rate of the flying camera 102 (e.g., magnetometers, accelerometers, gyroscopes) and connected to the fixed coordinate system 114 using a string 106. Assuming a taut string 106, accurate sensor measurements, and a known geometry of the flying camera 102, one formulates the mathematical model of the flying device's setup. In particular, one exploits the knowledge of the basic forces 120 acting on the flying camera's 102 center of mass 120, the mechanical constraints imposed by a taut string 106, and the resulting algebraic relationships between α 116, β 118, $F_p$, and $F_g$ as shown in FIG. 1. The resulting accelerometer measurements $a_x$ and $a_y$, aligned with the body reference frame ($x_b$, $z_b$), respectively, are $$a_x = -F_s \sin(\alpha-\beta)$$

$$a_z = F_p - F_s \cos(\alpha-\beta)$$

Since the string is taut, the forces in the direction of the string must be equal:

$$F_s = F_p \cos(\alpha-\beta) - g \cos\alpha + l\dot{\alpha}^2$$

where l is the string length.

The above mathematical model, describing the measured specific forces acting on the body as a function of α 116, β 118, $F_p$, $F_s$, and $F_g$, is then inverted either in closed-form or numerically, e.g. by sampling the model at regular intervals. The resulting indirect observation of the $F_g$ vector through the inertial sensors provides an absolute measurement of the gravity vector, and, therefore, angle β 118. In other words, the above method allows an evaluation unit to determine the direction of gravity based on the physical constraints imposed by the string and its inertial sensors, which in turn allows a control unit to stabilize the flying camera's 102 attitude and remain airborne and controllable.

In one approach, we may assume that the centripetal term $l\dot{\alpha}^2$ above is negligible. Given a nominal $F_p$ and accelerometer measurements $a_x$ and $a_z$, we may recover the tension force $F_s$ and the two angles:

$$F_s = \sqrt{a_x^2 + (a_z - F_p)^{\wedge}2}$$

$$\alpha = a\cos\left(\frac{F_p(F_p - a_z)/F_s - F_s}{g}\right)$$

$$\beta = \alpha - a\sin(-a_x/F_s)$$

Note that there is a sign ambiguity in this calculation; the evaluation unit may resolve this ambiguity by referencing the previously estimated values of α and β, and also by using other sensors, e.g. angle rate or string angle sensors, to provide a priori estimates at a given time.

When combined with additional information of the string length or vehicle altitude, such as from a barometric altimeter, this technique enables the evaluation unit to recover the relative position between a reference point 126 and a flying camera 102 by exploiting the simple trigonometric relationships of lengths and angles (see FIG. 1 for the 2D case). This may be used by the control unit to e.g., control the flying camera 102, aim the camera 110, or a combination thereof.

A refinement of this invention allows more precise localization if a force or direction sensor 124 is installed attaching the string 106 to the flying camera 102. In particular, such a sensor can provide data to be used by an evaluation unit to provide both a more robust estimate of α 116 and β 118 as well as improve user interaction with the flying platform. More particularly, if the height of the flying camera 102 or the length of the string 106 is known (e.g., stored in a memory unit), or unknown but held fixed, these angle estimates can be exploited to produce an attitude and/or position estimate using the evaluation unit. Specifically, the position and/or attitude may be partial (e.g., position on a circle or position along a line in a specific direction; direction in a plane or tilt along a single axis) or full 3D position and/or attitude. They may allow a control unit to actively stabilize the flying camera's 102 attitude and/or position relative to the reference point 126. This is achieved by exploiting the trigonometric relationships of lengths and angles in 3D (see FIG. 1 for the 2D case).

In addition, the pose estimation techniques disclosed here may be combined with other measurements such as from a satellite-based Global Positioning System, beacon-based position and attitude measurement systems, or others. For example, data from an additional yaw-attitude sensor, such as a magnetometer, mounted on the flying camera 102 may be used to allow an evaluation unit to produce a full 3D position and attitude estimate. This is achieved by exploiting the trigonometric relationships of lengths and angles, including the angle of the vehicle's attitude with respect to the user or another reference frame such as GPS coordinates in 3D. This may be especially useful in applications that require the flying camera to face in a given direction independent of the user's movement.

The method described above is not limited to specific flight configurations, such as the helicopter configuration shown in FIG. 1. The analysis leading to the recovery of the angles α 116 and β 118 can be shown to have good robustness qualities under proper operating conditions, meaning the described invention remains useful under wind conditions or when the reference point 126 is moving, such as being held by a moving person or attached to a moving vehicle or attached to a moving base station. Furthermore, although sensing is explained with reference to inertial sensors, the method described above is equally applicable when using other sensors providing data representative of attitude or position. Moreover, the method is not limited to use of a single string and many other mechanical arrangements are possible.

Figure 2:
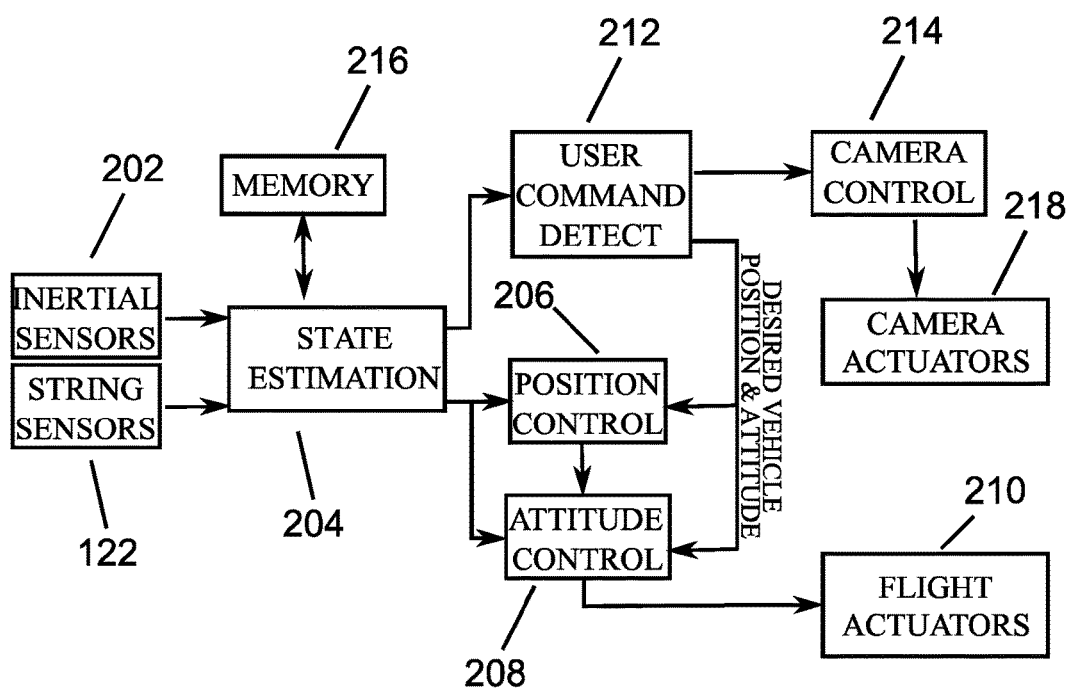
FIG. 2 shows a block diagram of an example control method.

FIG. 2 shows a block diagram of an example control method that may be used to stabilize the flying camera 102. During operation of the control method, a numerical method (the "state estimator" 204, typically implemented in an evaluation unit) is used to form an estimate of the state of the flying camera 102 from the measurements of a sensor for providing data representative of at least one of an acceleration, attitude, or rotational rate of the flying camera 102 and, optionally, a force sensor acting on the string attachment point 124 of the flying camera. In addition, a memory unit may be used. Depending on the specific requirements and use case, methods that may be used to form the estimate known in the prior art include one or multiple Luenberger Observers, Kalman Filters, Extended Kalman Filters, Unscented Kalman Filters, and Particle Filters, and combinations thereof. Proper onboard sensor fusion (typically implemented in an evaluation unit) can also provide operational fault robustness against invalid model assumptions, such as a momentarily relaxed string, providing valid short time-frame estimates and allowing for emergency procedures to be activated if necessary.

Based on the state estimate 204, a feedback control method 206, 208 (typically implemented in a control unit) provides control inputs to the at least one actuator 210, which, depending on the embodiment of the invention, may consist of rotary wings, swash plates, control surfaces, or other means to apply forces and/or torques to the flying camera 102. The feedback control is designed to control the position 206 and attitude 208, as described by the body coordinate system 112 and may consist of parallel or cascaded feedback control loops. Depending on the specific requirements and use case, methods that may be used to compute the flight actuator control signal include linear or nonlinear state feedback, model predictive control, and fuzzy control.

As an example embodiment, consider a vehicle operating in the vertical 2D plane, accepting as commands a nominal collective thrust $F_p$, and a desired angular rate $\dot{\beta}^*$. One possible control law to maintain a desired string angle $\breve{\alpha}$ is a cascaded controller, where a desired string angle acceleration $\ddot{\alpha}^*$ is first computed, to be then translated into a desired vehicle angle $\beta^*$, which in turn yields $\dot{\beta}^*$:

$$\ddot{\alpha}^* = \frac{1}{\tau_s^2(\breve{\alpha} - \alpha)} - \frac{2\zeta_s}{\tau_s}\dot{\alpha}$$

Where $\tau_s$ and $\zeta_s$ are tuning factors, corresponding to the desired time constant of the closed-loop string angle system and the desired damping ratio. Then the desired vehicle angle and angle rate may be computed as follows:

$$\beta^* = \alpha - a\sin((g\sin\alpha - l\ddot{\alpha}^*)/F_p)$$

$$\dot{\beta} = 1/\tau_v(\beta^* - \beta)$$

where $\tau_v$ is also a tuning parameter.

The state estimate 204, in particular the recovered value of $F_s$, may also be used as a communication channel or to detect the user interacting with the flying camera. A user command detection 212 detects matches of the state information (e.g., vehicle is airborne, vehicle is filming) with predefined or computationally learnt interaction patterns (e.g., three quick tugs on the string, two strong tugs followed by a long pull sideways). Based on the detected patterns, the feedback control methods (typically implemented in a control unit) 206, 208 are provided with data representative of the command that the user 108 provided. The command is also forwarded to a camera control system 214, therefore allowing the user 108 to independently control the behaviour of the flying camera 102 and the camera 110. The user interaction system implemented in the user command detection system 212 is further detailed in the following section.

Figure 3:
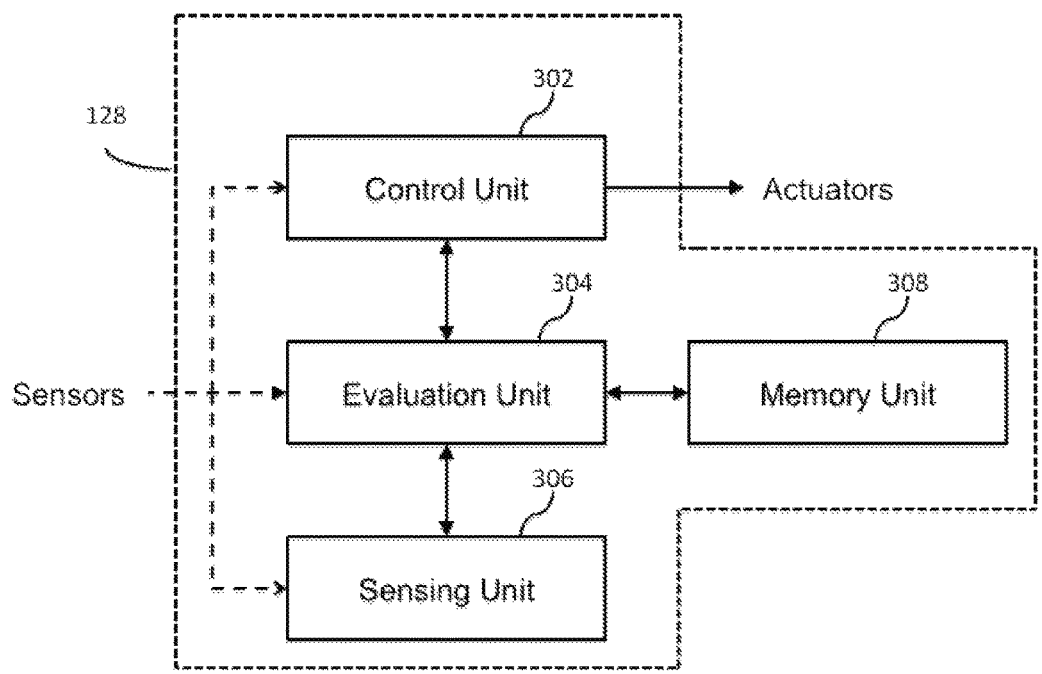
FIG. 3 shows a block diagram of the flight module and its parts.

FIG. 3 shows a block diagram of the flight module 128 and its parts, including a control unit 302, evaluation unit 304, sensing unit 306 and memory unit 308. The flight module receives sensor information as input and provides data to the actuators.

Depending on the specific requirements and use case, multiple evaluation units, sensing units, memory units, and control units may be used. Similarly, multiple steps (e.g., both, steps relating to data representative of position and/or attitude as well as steps relating to data representative of user interactions) may be performed in a single unit.

Sensing units are used to process sensor information. For example, they may process information received from sensors, such as accelerometers, gyroscopes, magnetometers, barometers, thermometers, hygrometers, bumpers, chemical sensors, electromagnetic sensors, or microphones (none shown). For example, a sensing unit may process information to extract data on forces caused by the mechanical connection of a volitant body, such as a flying camera, to the reference point. Such forces may for example be caused by the vehicle being restrained by the string, by a user tugging on the string or by disturbances, such as those caused by wind or motor malfunction. A sensing unit may also be used to detect patterns in data representative of mechanical forces applied to a mechanical arrangement, such as a string in order to realize a communication channel using the mechanical arrangement. In addition, sensing units may process information from one or multiple cameras 110, 608 aboard the flying camera 102.

Evaluation units are used to evaluate data. For example, they may evaluate data representative of both relative or absolute position, particularly that of GPS sensors, visual odometry/SLAM, retro-reflective positioning systems, laser range finders, WiFi positioning systems, barometric altimeters and variometers, or ultra-sound sensors (none shown). For example, they may use data representative of mechanical forces provided by the sensing unit to infer data representative of position and attitude of a volitant body, such as a flying camera, relative to a reference point.

Memory units are used to store data. For example, they may be used to store data on past sensor readings, operational states or user commands, as well as properties of the flying camera 102 and string 106.

Control units are used to control actuators. For example, they may allow active (and passive) self-stabilization by generating control outputs for the flight actuators (e.g. the air propulsion system 104) as well as other actuators (e.g., camera 110 zoom/pan/tilt motors). These control outputs may be generated in dependence of data representative of position and attitude provided by the evaluation unit User Interaction Direct measurement via an optional force sensor 124 or estimation of the force $F_s$ exerted by the string 106 may enable an evaluation unit 304 to detect user interaction with the flying camera 102 via physical forces applied to the string 106. Optionally, to allow for communication from the flying camera 102 to the user, a control unit 302 may be configured to allow user interaction by controlling at least one actuator of the flying camera 102.

Figure 4:
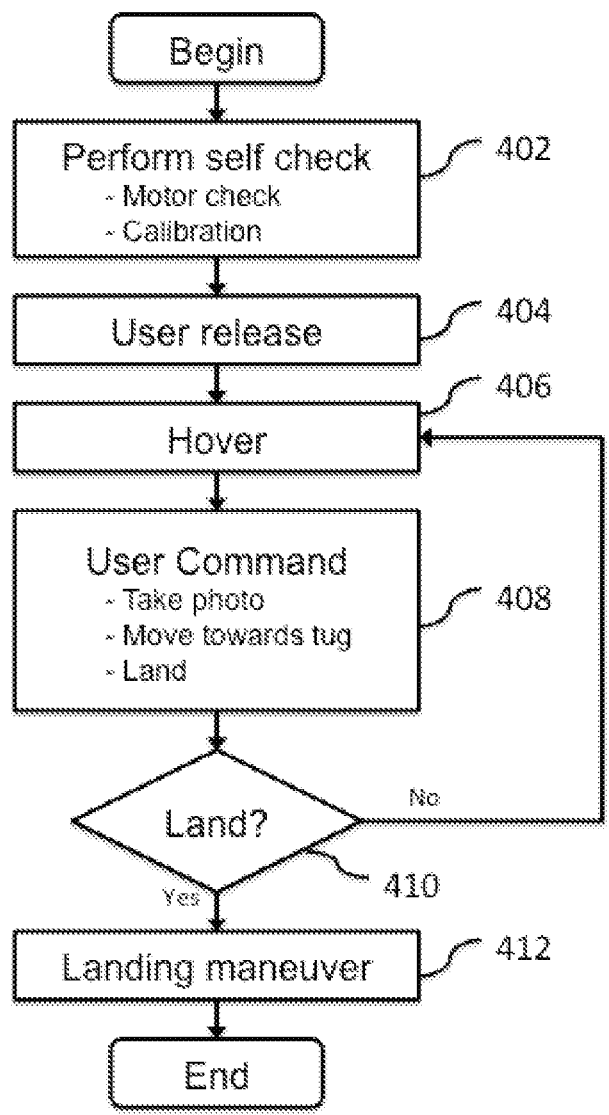
FIG. 4 shows a flowchart for explaining the process of using the flying camera.

FIG. 4 shows a flowchart of an exemplary user interaction process with the flying camera 102 for the sample application of aerial imaging. After turning on the power switch, the flying camera 102 performs a self check 402. The check is designed to ensure correct, safe operation of all units and actuators of the flying camera 102 before it becomes airborne. For example, it may comprise checks that all components have initialized correctly, that the flying camera responds to string commands, or that battery levels are sufficient for flight. In addition, the self check 402 may comprise calibration steps, such as positioning the device on a level surface to calibrate the internal inertial sensors or adjusting the white balance for the attached camera 110. The self check 402 may further comprise other checks, such as hanging the device from the string 106 to determine if it has a suitable weight and weight balance with respect to its center of mass 122 and string attachment point 124, or if the position of the camera 110 or the battery pack (not shown) needs to be adjusted.

After a successful self check 402 the flying camera is ready for user release 404. User release 404 may be performed in a variety of ways, depending on the size, weight, passive and active safety features, or its sensory capabilities. For example, a user may first hold the flying camera 102 above their head, then command it to spin up its propellers 104 by shaking it twice (typically detected by an evaluation unit 304), and then release a handle 602 with an integrated safety switch 604. In other cases, the flying camera 102 may be started or operated from a base station placed on the ground (not shown), or held in the user's hand, or it may be started by simply tossing it higher than two meters into the air and allowing it to auto-stabilize.

The flying camera 102 then enters a Hover Mode 406, where a control unit 302 stabilizes its position by sending appropriate commands to the actuators in dependence of data received from an evaluation unit 304. Stabilization may be relative to a reference point, the string, the air, the ground, or a combination thereof.

In the exemplary flowchart shown in FIG. 4, the flying camera is then ready to perform maneuvers based on user commands. Such maneuvers may be triggered by detecting representative data using a sensing unit 306 and processing said data, optionally together with data from a memory unit 308, in an evaluation unit 304.

Maneuvers are sequences of desired vehicle positions, attitudes, and actions and are typically stored in a memory unit 308. Maneuvers are typically executed by sending appropriate commands to the actuators in dependence of data received from an evaluation unit 304. Simple examples include "Take photo", "Move towards tug", or "Land". However, maneuvers can also comprise more complex routines, such as "Take panoramic photo", which involves controlling the vehicle to a sequence of positions and taking a sequence of images. Unlike the example shown in FIG. 4, maneuvers may also comprise entire operations performed without user input. For example, a user may select settings on a user interface that cause the flying camera to perform a maneuver that involves autonomous take off, flying to a set point relative to the reference point 126, taking a series of photographs, and finally returning to the launch position for autonomous landing.

Once the user issues a command to land 410, typically detected by an evaluation unit 304, the control unit 302 commands actuators such that the flying camera 102 performs a landing maneuver 412 and exits the program.

Figure 5:
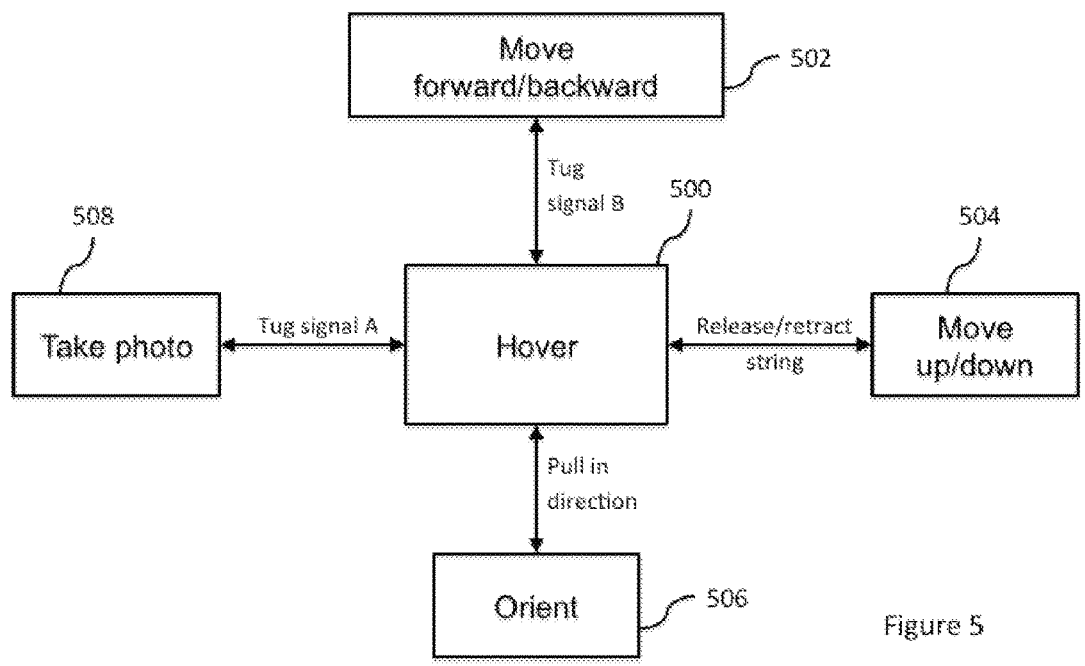
FIG. 5 shows a block diagram for explaining the user interaction with the flying camera by using a string.

FIG. 5 shows an exemplary embodiment of a simple state machine for user interaction with the flying camera 102 (typically implemented in an evaluation unit 304). When the flying camera 102 is hovering, the user 108 on the ground may move the reference point 126 laterally, causing the flying camera 102 to perform a lateral shift maneuver 502. The user may also release or retract the string to change the flying camera's altitude 504. Furthermore, the user may use a signal, such as a short tug 508 on the string (typically detected by an evaluation unit 304 based on data from at least one sensing unit 306), to trigger a certain action such as taking a photograph or video. Finally, the user may use signals, such as sideways tugs, to tell the flying camera 102 to reorient 506. For example, a tug signal may be detected by an evaluation unit 304 based on data provided by a sensing unit 306 and, optionally, data provided by a memory unit 308, and cause the control unit 302 to send commands to actuators such that a reorientation occurs. Similarly, the vehicle may use signals to communicate with the user, e.g. instead of the reorientation in the example above, a control unit 302 may send commands to actuators such that a communication signal (such as a tug signal) is sent to the user.

User interaction input typically detected by the evaluation unit 304 can comprise any combination of the direction, magnitude, and time sequence of forces applied to the string 106 (e.g., at its end or at the reference point 126). It can be measured via a force sensor at the string attachment point 124 or via other sensors (e.g., accelerometers, rate gyros). It can be identified by user command detection methods 212. This setup allows for a rich and intuitive user interface, significantly extending existing interfaces, such as those known from mouse clicks (which do not account for direction and magnitude), or mouse gestures (which do not account for magnitude).

Furthermore the flying camera 102 may provide a communication channel based on mechanical forces (e.g., haptic feedback such as mechanical stimulation used in tactile feedback) for communication between a base station at the reference point or for user interaction via a string. This may be used for bi-directional communication, for example, to communicate to the reference point whether a command has been recognized and whether a command has been entered correctly. To realize such a communication channel, the onboard controller of the flying camera can, for example, command a series of small jerks, using the propulsion system, to indicate a particular haptic message back to the user via the taut string. As another example, the flying camera could execute a continuous series of upward jerks, in a clearly perceivable time-force pattern, to indicate a warning or error condition such as low battery or full onboard memory. For example, the string may be used as a communication channel for user commands to be sent from the user to the flying camera, or user feedback to be sent from the flying camera to the user, based on mechanical forces applied to the string.

The flying camera can also provide visual feedback via light displays or by intentionally performing clearly interpretable motions as a visual response to user commands, providing the user a means of learning the necessary commands and the contexts they can be used in. Both haptic and visual feedback are key components for intuitive user interfaces. Depending on the size and proximity of the flying camera, such clearly interpretable maneuvers may be further improved by adding suitable auditory cues, further improving the reliability of user interaction. Haptic, visual, and auditory feedback can be generated using the flying camera's main actuators (e.g., its motors) or additional actuators (e.g., vibrators, linear actuators, lights, speakers) or a combination of both.

Maneuvers can be active or passive. Active maneuvers are triggered by the User Command Detect 212 and governed by the flying camera's control method (FIG. 2). For example, the flying camera 102 may perform a single full controlled rotation on the spot following a user command. Passive maneuvers are purely the result of user interaction with the physical dynamics, determined by the flying camera, the string assembly, and its feedback control system. They emerge from the stabilization behavior of the flying vehicle and take advantage of the robustness of the standard state estimation and control behavior to change the state of the flying camera. For example, a user may release additional string and thereby allow the flying camera to fly higher.

Maneuvers may treat user input as binary or continuous. For example, a detected change in the magnitude of force on the string may only trigger a maneuver if it passes a threshold. Continuous user input may also serve as a parameter. For example, the magnitude of force on the string may be used as an indication for the desired amount of side movement or the number of photos to be taken.

Maneuvers can be executed sequentially or in parallel. For example, the flying camera may not accept further commands before completing a sequence of photos suitable for assembly of a panoramic image. Or, a user may issue a lateral movement command 502 and simultaneously retract the string, constraining the flying camera to a spiraling motion towards the user.

It should be noted that while the above descriptions list only a small number of user interaction cases with exemplary embodiments by way of example, the possible user input commands via the string, flying camera responses via the string, and possible maneuvers of the flying camera give rise to a large number of possible input-output mappings and user interaction scenarios. Given the benefits of the present disclosure, one of ordinary skill in the art can devise suitable communication schemes involving user input or various communication channels (including based on mechanical forces, etc.) for a wide range of applications, between a wide range of entities (including for users, base stations, etc.), and for a wide range of volitant bodies other than flying cameras.

Further Exemplary Embodiments

Figure 6:
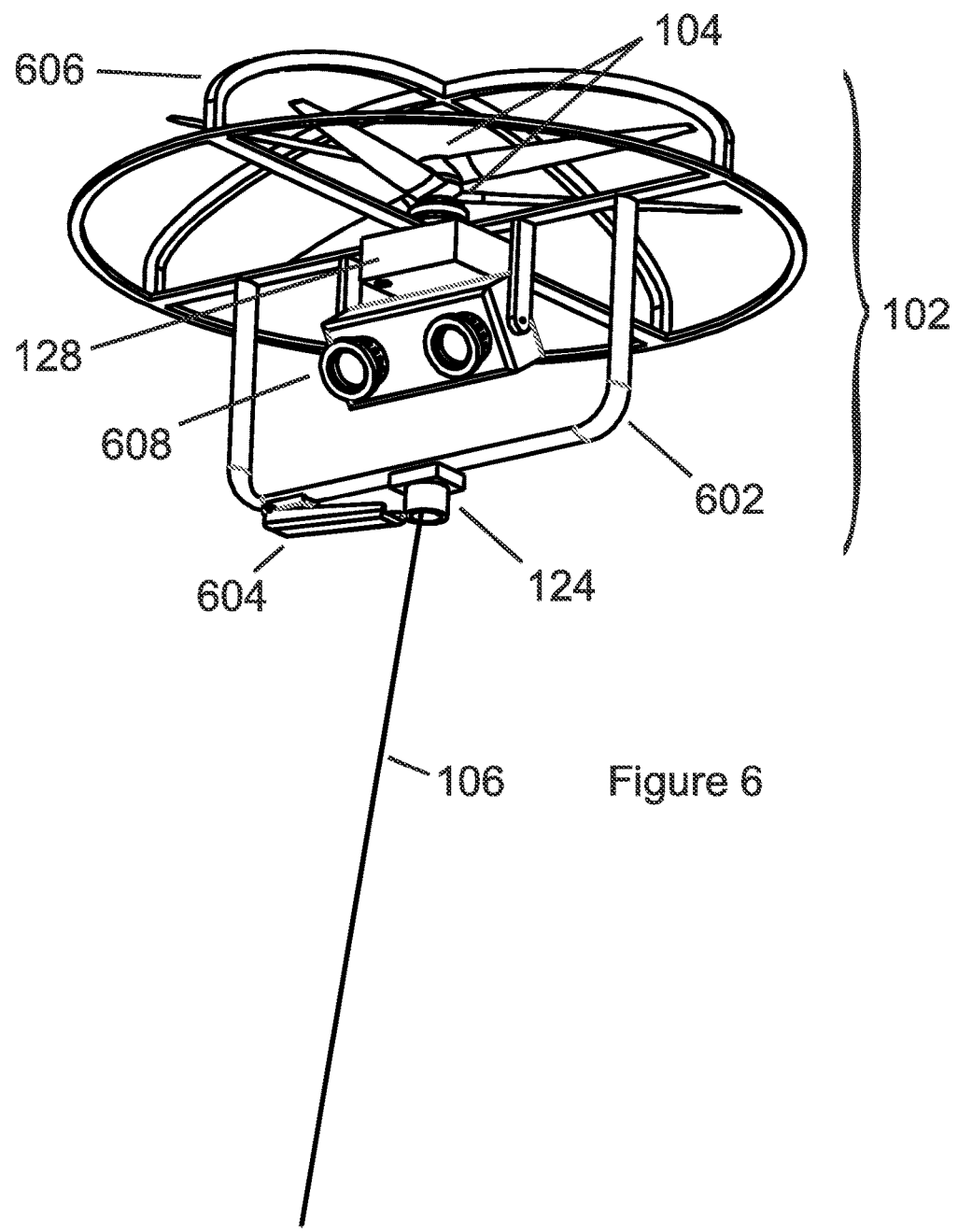
FIG. 6 shows another embodiment of a flying camera with a safety shroud around a counter-rotating propeller configuration and a stereo camera setup.

FIG. 6 shows another exemplary embodiment of a flying camera 102. The embodiment of FIG. 6 is equipped with various active and passive safety features, including a handle 602 for launch/retrieval convenience; a safety switch 604 mounted on the handle to enable quick, safe launches; and a light but rigid cage 606 surrounding the propulsion system 104.

Various other safety features may be employed, depending on the requirements and use case. In particular, the flying camera 102 may be equipped with additional passive (e.g., non-conductive string assembly, pre-determined breaking points, crash-safe propellers, redundant components) and active (e.g., autonomous obstacle avoidance, auto-stabilization, autonomous take-off/landing, audible alarm, visual error indicator, deadman switch, emergency kill switch, backup flight control routines (automated/autonomous "co-pilots")) safety features (none shown) to reduce risks to the operator, to their environment, and to the flying camera 102.

The embodiment of FIG. 6 is equipped with a propulsion system comprising two coaxial, counter-rotating propellers. One or both of the propellers may be equipped with a mechanism, such as a swash plate, or another means of producing controlled torque, such as a control moment gyroscope, to produce the required forces and torques to control the flying camera 102.

Moreover, various other propulsion systems may be employed, depending on the requirements and use case. In particular, the flying camera 102 may be equipped with flybars; passively stable rotor assemblies, such as those described in U.S. Pat. No. 7,494,320; or quadrocopter, hexacopter, or other multi-rotor configurations (none shown) to increase efficiency and redundancy.

The embodiment of FIG. 6 shows a stereo camera setup 608 for depth-enabled imaging or 3D telepresence applications. Generally, the cameras mounted on the flying camera 102 may be any type of sensor receptive to electromagnetic radiation, including those with active sensors (e.g., structured light and projection systems).

In the embodiment of FIG. 6, the flight module 128 is positioned on the flying camera 102. However, depending on the requirements and use case, some or all of its components including control units, sensing units, evaluation units, and memory units, may also be positioned elsewhere including at the reference point 126.

For some embodiments additional functionalities, such as wireless communication, onboard image processing, or battery-heating circuitry (none shown) may be added as required. Furthermore, other properties of a string 106 may be exploited, such as using it as a fiber-optic communication medium, using it as a bending sensor, using it to lift other types of sensor, or as a sensor for measuring properties, such as strain or twist.

Although the description above contains many specificities, these should not be construed as limiting the scope of the embodiments but as merely providing illustrations of some of several embodiments. For example, lift can be achieved using a large variety of means including propellers, airfoils, ducts, and vanes; said means can be assembled in many configurations including fixed-wing, rotary-wing, and ornithopters; strings can have various elasticity or comprise sensing elements. Thus the scope of the embodiments should be determined by the appended claims and their legal equivalents, rather than by the examples given.

REFERENCE NUMBERS

102 Flying camera
104 Air propulsion system
106 String
108 User
110 Camera
112 Body coordinate system
114 Global coordinate system
116 α (Alpha) (angle user to flying camera)
118 β (Beta) (angle flying camera to gravity)
120 Forces acting on flying camera
122 Center of mass of the flying camera
124 Force sensor/string attachment point
126 Reference point
128 Flight module
202 Inertial sensors
204 State estimation
206 Position control
208 Attitude control
210 Flight actuators
212 User command detect
214 Camera control
216 Memory
218 Camera actuators
302 Control unit
304 Evaluation unit
306 Sensing unit
308 Memory unit
402 Perform self-check
404 User release
406 Hover
408 User command
410 Land
412 Landing maneuver
500 Hover
502 Move laterally
504 Move up/down
506 Orient
508 Take photo
602 Handle
604 Safety switch
606 Protective cage
608 Stereo camera

The invention claimed is:

1. An arrangement comprising:
   a volitant body;
   a tether connecting the volitant body to a reference point; and
   one or more physical processors configured to:
   determine a tension in the tether based on an acceleration of the volitant body; and
   determine an angle between a line connecting the volitant body and the reference point and a vertical line, and an attitude of the volitant body based on the tension and the acceleration.

2. The arrangement of claim 1, wherein the tether is operationally connected to the one or more physical processors.

3. The arrangement of claim 1, wherein the one or more physical processors are further configured to:
   obtain first information representative of one or both of the attitude or a position of the volitant body relative to the reference point; and
   control an actuator of the volitant body based on the first information.

4. The arrangement of claim 3, wherein the one or more physical processors are further configured to:
   obtain second information representative of mechanical forces applied to the tether; and
   evaluate the second information to determine the first information.

5. The arrangement of claim 4, wherein the one or more physical processors are mechanically coupled to the volitant body.

6. The arrangement of claim 4, further comprising:
   a sensor, the sensor being configured to generate measurements for determining the mechanical forces.

7. The arrangement of claim 3, further comprising:
   a sensor, the sensor being configure to generate measurements representative of the position of the volitant body relative to the reference point.

8. The arrangement of claim 3, further comprising:
   a memory coupled to the one or more physical processors, the memory being configured to store second information related to properties of the tether and third information related to properties of the volitant body; and
   wherein the one or more physical processors are further configured to:
   perform an evaluation using one or both of the second information or the third information; and
   generate the first information representative of one or both of the attitude or the position of the volitant body relative to the reference point.

9. The arrangement of claim 1, further comprising:
   a sensor, the sensor being configure to generate measurements representative of one or more of the acceleration, the attitude, or a rotational rate of the volitant body.

10. The arrangement of claim 1, wherein the volitant body further comprises a camera, and wherein the one or more physical processors are further configured to capture images using the camera.

11. A method to operate an arrangement comprising a volitant body, a tether connecting the volitant body to a reference point, and one or more physical processors, the method comprising:
   controlling the volitant body to fly remote from the reference point;
   determining a tension in the tether using an acceleration of the volitant body; and
   determining an angle between a line connecting the volitant body and the reference point and a vertical line, and an attitude of the volitant body based on the tension and the acceleration.

12. The method of claim 11, further comprising:
   obtaining first information representative of one or both of the attitude or a position of the volitant body relative to the reference point; and controlling an actuator of the volitant body based on the first information.

13. The method of claim 12, further comprising:
determining second information representative of mechanical forces applied to the tether; and
determining the first information based on the second information.

14. The method of claim 12, further comprising:
obtaining second information related to properties of the tether;
obtaining third information related to properties of the volitant body; and
performing an evaluation using one or both of the second information or the third information.

15. The method of claim 11, further comprising:
evaluating mechanical forces applied to the tether to provide evaluation results; and
controlling an actuator of the volitant body based on the evaluation results.

16. The method of claim 15, further comprising determining one or more of a direction, a magnitude, or a time sequence of the mechanical forces.

17. The method of claim 15, further comprising controlling of an actuator of the volitant body, including at least one of executing active maneuvers, detecting continuous user input, and detecting parallel user input.

18. The method of claim 11, further comprising:
communicating with the reference point by applying one or more forces to the tether, wherein an actuator of the volitant body is controlled so that the volitant body applies the one or more forces to the tether.

19. The method of claim 11, further comprising:
receiving information relating to one or more of a direction, a magnitude, or a time sequence of forces applied to the tether; and
controlling the volitant body so that the volitant body performs a predefined maneuver, wherein the predefined maneuver is associated with the received information.

20. The method of claim 11, wherein the volitant body further comprises a camera, and the method further comprises capturing aerial images using the camera.

* * * * *